(12) United States Patent
Muehlberg et al.

(10) Patent No.: US 10,922,813 B2
(45) Date of Patent: Feb. 16, 2021

(54) METHOD FOR DETERMINING AT LEAST ONE OBJECT FEATURE OF AN OBJECT

(71) Applicant: Siemens Healthcare GmbH, Erlangen (DE)

(72) Inventors: Alexander Muehlberg, Nuremberg (DE); Rainer Kaergel, Forchheim (DE); Michael Wels, Bamberg (DE); Michael Suehling, Erlangen (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 209 days.

(21) Appl. No.: 16/154,771

(22) Filed: Oct. 9, 2018

(65) Prior Publication Data
US 2019/0114767 A1    Apr. 18, 2019

(30) Foreign Application Priority Data
Oct. 16, 2017    (EP) .................................... 17196657

(51) Int. Cl.
*G06T 7/00* (2017.01)
*G06T 11/00* (2006.01)
*G06N 7/00* (2006.01)

(52) U.S. Cl.
CPC ............. *G06T 7/0012* (2013.01); *G06N 7/00* (2013.01); *G06T 7/0014* (2013.01);
(Continued)

(58) Field of Classification Search
None
See application file for complete search history.

(56) References Cited

U.S. PATENT DOCUMENTS 9,058,692 B1 *  6/2015  Grady ................... G06T 7/0014
9,836,840 B2 * 12/2017  Fonte ................... A61B 5/0261
(Continued)

OTHER PUBLICATIONS

Lars Gjesteby, Qingsong Yang, Yan Xi, Ye Zhou, Junping Zhang, Ge Wang, "Deep learning methods to guide CT image reconstruction and reduce metal artifacts," Proc. SPIE 10132, Medical Imaging 2017: Physics of Medical Imaging, 101322W (Mar. 9, 2017); doi: 10.1117/12.2254091 (Year: 2017).*
(Continued)

*Primary Examiner* — Andrae S Allison
(74) *Attorney, Agent, or Firm* — Harness, Dickey & Pierce, P.L.C.

(57) ABSTRACT

A method is for determining at least one object feature of an object at least partially depicted by an object image. A respective preliminary feature for each object feature and at least one acquisition feature are determined from the object image. The preliminary feature depends on the object feature and on an imaging device used to acquire the object image and/or at least one imaging parameter used for acquiring and/or reconstructing the object image and/or an additional feature of the object. The acquisition feature depends on the imaging device and/or the imaging parameter and/or the additional feature of the object. A correction algorithm determines the object feature from the preliminary feature and the acquisition feature. The acquisition feature is determined by a respective determination algorithm that is selected and/or parametrized from a group of candidate algorithms, depending on multiple reference images.

23 Claims, 5 Drawing Sheets

(52) U.S. Cl.
CPC .. *G06T 11/008* (2013.01); *G06T 2207/10072* (2013.01); *G06T 2207/10081* (2013.01); *G06T 2207/20076* (2013.01); *G06T 2207/20081* (2013.01); *G06T 2207/30048* (2013.01); *G06T 2207/30056* (2013.01); *G06T 2207/30096* (2013.01); *G06T 2207/30101* (2013.01); *G06T 2210/41* (2013.01)

(56) References Cited

U.S. PATENT DOCUMENTS

| | | | |
|---|---|---|---|
| 10,117,597 B2* | 11/2018 | Beckers | G16H 30/20 |
| 10,600,184 B2* | 3/2020 | Golden | G06N 3/084 |
| 2009/0074278 A1* | 3/2009 | Beaulieu | G06T 5/10 |
| | | | 382/131 |
| 2012/0010711 A1* | 1/2012 | Antonyshyn | A61F 2/30942 |
| | | | 623/16.11 |
| 2015/0117740 A1* | 4/2015 | Dong | G06T 5/005 |
| | | | 382/131 |
| 2015/0146955 A1* | 5/2015 | Dong | G06T 11/008 |
| | | | 382/131 |
| 2015/0356728 A1* | 12/2015 | Nakanishi | G06T 5/002 |
| | | | 382/131 |
| 2017/0236309 A1* | 8/2017 | Arens | G06T 11/008 |
| | | | 382/131 |
| 2019/0192099 A1* | 6/2019 | Jia | G06T 11/003 |

OTHER PUBLICATIONS

Y. Zhang and H. Yu, "Convolutional Neural Network Based Metal Artifact Reduction in X-Ray Computed Tomography," in IEEE Transactions on Medical Imaging, vol. 37, No. 6, pp. 1370-1381, Jun. 2018, doi: 10.1109/TMI.2018.2823083. (Year: 2018).*

Nyflot, Matthew J. et al. "Quantitative radiomics: impact of stochastic effects on textural feature analysis implies the need for standards." Journal of Medical Imaging, 2, No. 4, pp. 041002-1-041002-13; 2015, XP055462273; ISSN: 2329-4302, DOI: 10.1117/1.JMI.2.4.041002.

Extended European Search Report #17196657.5 dated Apr. 5, 2018.
European Office Action dated Oct. 8, 2020.

* cited by examiner

METHOD FOR DETERMINING AT LEAST ONE OBJECT FEATURE OF AN OBJECT

PRIORITY STATEMENT

The present application hereby claims priority under 35 U.S.C. § 119 to European patent application number EP17196657.5 filed Oct. 16, 2017, the entire contents of which are hereby incorporated herein by reference.

FIELD

Embodiments of the invention generally concern a method for determining at least one object feature of an object that is at least partially depicted by an object image, especially an object image acquired by a medical imaging device, wherein a respective preliminary feature for each object feature and at least one acquisition feature are determined from the object image, wherein the preliminary feature depends on the object feature and on an imaging device used to acquire the object image and/or at least one imaging parameter used for acquiring and/or reconstructing the object image and/or an additional feature of the object, especially an additional feature that influences the image quality of the object image, wherein the acquisition feature depends on the imaging device and/or the imaging parameter and/or the additional feature of the object, wherein a correction algorithm determines the object feature from the preliminary feature and the acquisition feature.

BACKGROUND

An automatic extraction of features of an at least partially depicted object is especially useful in medical imaging. Automatic feature extraction is e.g. often used in radiomics. A multitude of images can be analysed to extract the respective features of depicted objects and these features can be stored in a data base. Once a new medical image is analysed and its features are extracted the resulting feature vector can be used to extract similar cases from the data base. Preferably the different data sets in the data base can be classified according to certain criteria and/or enriched with additional information, e.g. a prognosis and/or development of a certain disease, information concerning therapies, etc.

Radiomics was first used in the area of oncology and used to process computed tomography images. The technique can however be applied to a multitude of medical areas or other areas of research to recognise certain conditions in two dimensional or three dimensional images and/or to provide high level statistical information e.g. to group patients into certain groups, generate a prediction for a survival time or generate information about the probability of certain diseases.

Radiomics and similar approaches work best when relatively large data bases are available. It is therefore advantageous to combine features from a multitude of images that are acquired with different imaging devices and/or from different objects and/or using different imaging parameters for acquiring and/or reconstructing the respective image in a common data base. It is however obvious that most features that are extracted from an image will show a dependence on the imaging device used and/or on the imaging parameters and/or additional parameters of the object that can influence the image quality, e.g. a Body-Mass-Index, a height and/or the bone structure of a patient, or modify the image, e.g. the concentration of a contrast agent. The additional parameters of the object can e.g. lead to different noise levels and/or types and/or to different imaging artefacts for different objects, even when the same imaging device is used with the same imaging parameters.

This can e.g. influence clinical studies on a large scale, since in many cases data from a multitude of different clinics using different scanners and/or different scan parameters is collected to e.g. assess the effect of a pharmaceutical drug or a therapy. This variation of the technical parameters between different sites could influence the results of the study, e.g. when the distribution of the used scanners and scan parameters between a medicated or treated group and the control group is not balanced.

Recognising and preferably reducing the dependence of the extracted features on technical parameters could also be advantageous in a follow-up image acquisition e.g. when changes in a tumour should be monitored. A reduction of the features dependence on the technical parameters would allow a robust tracking of the feature even when switching scanner and/or scan parameters.

There can also be a certain degree of technical variation as a result of noise and artefact variation, even if the same imaging device and the same imaging parameters are used. In X-ray imaging noise and artefacts can e.g. strongly depend on the patient geometry and density characteristics. While these variations might not be recognizable for a human observer they still might influence large scale studies that use automatically extracted features.

Different approaches exist to reduce the impact of technical variation on the extracted features. A common approach is the imaging of an anthropomorphic phantom with different scan parameters. In this case the influence of the scan parameters on the extracted features can be directly measured. Studies on phantoms do however not exactly reproduce the impact of technical variation on the imaging of real biological objects. Also the impact of inter-patient noise and artefact variation cannot be determined.

The impact of technical variations can also be reduced by using de-noising and artefact reduction filters. De-noising will however lead to a loss of information. Especially texture features and fine-grained information is potentially lost. Also de-noising and artefact reduction filters have to be carefully chosen to not influence the extracted features.

Another approach is to normalise extracted features by proportional scaling. The feature value is divided or multiplied by a so called surrogate, e.g. the global signal level, depending on the correlation of the feature with the surrogate. The disadvantage of proportional scaling is that when the impact of the technical variation on a feature is low, a division or multiplication with a surrogate can induce a large error. Differences in the normalised feature can then mainly depend on the value of the surrogate.

An alternative approach to using surrogates is the use of a general linear model to adjust the measured feature values for the impact of a surrogate. The values are therefore linearly transformed by parameters derived from a mutual covariance analysis between the surrogate and a feature in the region of interest. E.g. the global signal intensity can be used as a surrogate. The main problem of this approach is the selection of a good surrogate, since it is typically unclear whether an association between the surrogate and the feature is induced biologically or technically. The use of a general linear model might also be problematic, when the impact of the technical variation is not truly linear.

The impact of technical variation can also be investigated via simulation. Digital phantoms of biological structures can be used and the technical variation can be simulated. Digital phantoms do however not necessarily reproduce the complexity of real biological structures with sufficient detail. It is also typically not possible to ensure that the simulated technical variation truly matches the impact of the real technical variation in a study.

For some features it is also possible to use an approach called invariant feature engineering. The feature is calculated using an additional term that stabilises the feature against the impact of technical variation. Currently it is however only possible to determine the correction term by trial-and-error and only a few simple features can be corrected by this approach.

SUMMARY

At least one embodiment of the present invention provides a method for determining at least one feature of an object, especially of a patient in medical imaging, that can further reduce the impact of technical acquisition parameters on the extracted features.

At least one embodiment of the present invention provides a method for determining at least one object feature of an object that is at least partially depicted by an object image, especially an object image acquired by a medical imaging device, wherein a respective preliminary feature for each object feature and at least one acquisition feature are determined from the object image. The preliminary feature depends on the object feature and on an imaging device used to acquire the object image and/or at least one imaging parameter used for acquiring and/or reconstructing the object image and/or an additional feature of the object, especially an additional feature that influences the image quality of the object image. The acquisition feature depends on the imaging device and/or the imaging parameter and/or the additional feature of the object. A correction algorithm determines the object feature from the preliminary feature and the acquisition feature. In at least one embodiment of the method, the acquisition feature is determined by a respective determination algorithm that is selected and/or parametrized from a group of candidate algorithms, wherein this selection and/or parametrization depends on multiple reference images.

At least one embodiment of the present invention provides a method for determining at least one object feature of an object, at least partially depicted by an object image, the method comprising:

determining a respective preliminary feature for each respective object feature, of the at least one object feature, and determining at least one acquisition feature from the object image, the respective preliminary feature depending on the respective object feature and on an imaging device used to acquire at least one of the object image and at least one imaging parameter usable for at least one of acquiring and reconstructing at least one of the object image and an additional feature of the object, the at least one acquisition feature being dependent upon at least one of the imaging device, the at least one imaging parameter and the additional feature of the object;

determining, via a correction algorithm, the respective object feature from the respective preliminary feature and the at least one acquisition feature, wherein the determining of the at least one acquisition feature includes determining the at least one acquisition feature by a respective determination algorithm, at least one of selected and parametrized from a group of candidate algorithms, and wherein the at least one of selection and parametrization depends upon multiple reference images.

Besides embodiments of the inventive method, at least one embodiment of the invention also concerns a processing unit, especially a processing unit of a medical imaging device, configured to perform a method according to at least one embodiment of the present invention.

At least one embodiment of the invention also concerns a computer program that can be directly loaded into a memory unit of a processing unit, especially a processing unit of a medical imaging device, the computer program comprising instructions for performing the steps of the method according to at least one embodiment of the present invention when the program is executed on the processing unit.

At least one embodiment of the invention also concerns a memory unit storing a computer program including instructions for performing the method of claim 1 when the computer program is executed on a processing unit of a medical imaging device.

At least one embodiment of the invention also concerns a non-transitory computer-readable storage medium containing electronically readable instructions comprising the computer program according to at least one embodiment of the present invention.

BRIEF DESCRIPTION OF THE DRAWINGS

The above and further aspects, features and other advantages of the present invention will be more clearly understood from the following detailed description of example embodiments taken in conjunction with the accompanying drawings which shows schematically.

DETAILED DESCRIPTION OF THE EXAMPLE EMBODIMENTS

Figure 1:
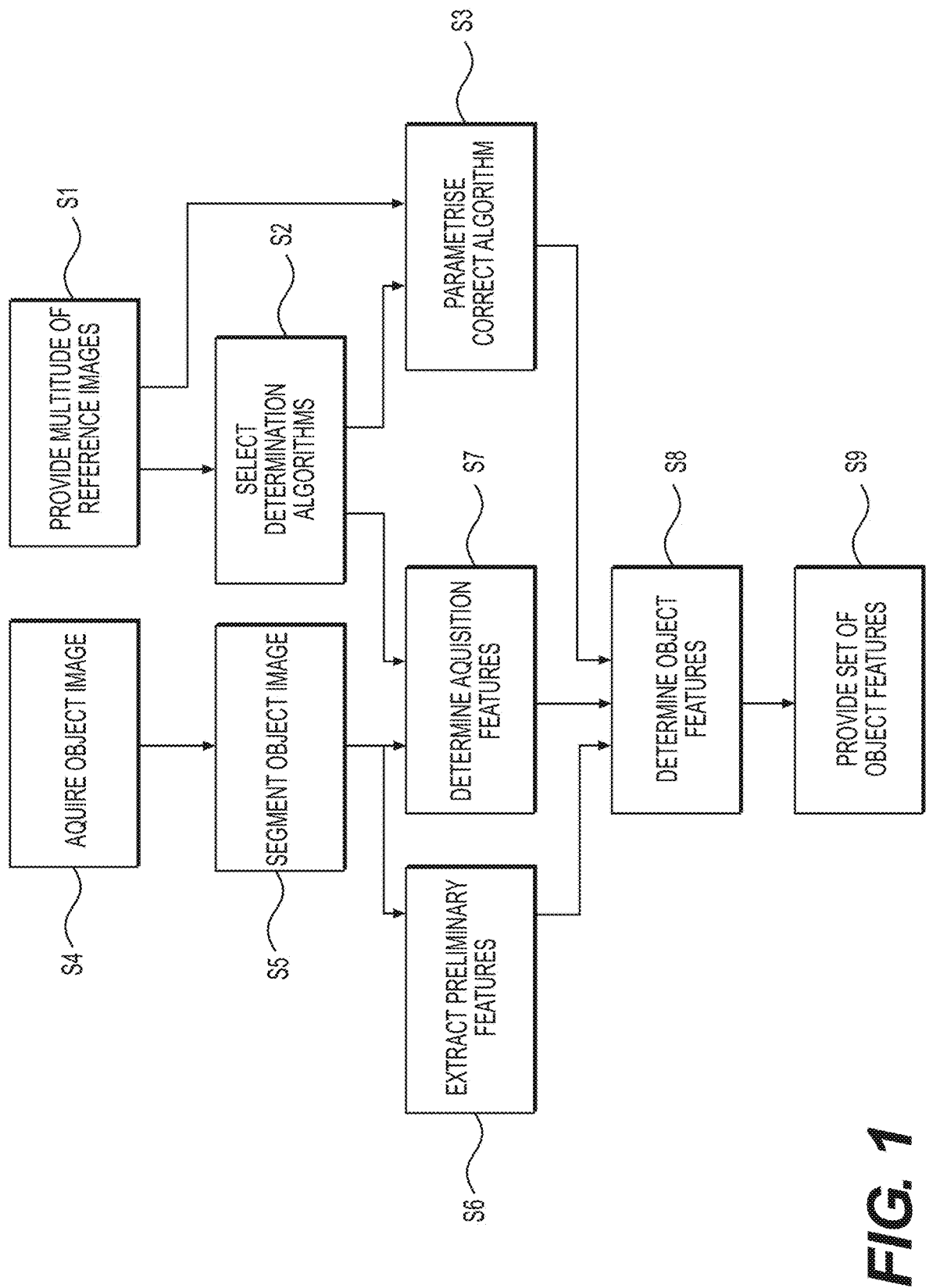
FIG. 1 a flow chart of an embodiment of the method according to the present invention, FIG. 2 an example of an object image that can be processed by the method according to FIG. 1, FIG. 3 a flow chart for the selection of the determination algorithms in the method according to FIG. 1, and FIG. 4 a medical imaging device that comprises a processing unit according to an embodiment of the present invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices.

The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device may also access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In at least one embodiment of the method for determining that at least one object feature of an object, the acquisition feature is determined by a respective determination algorithm that is selected and/or parametrized from a group of candidate algorithms, wherein this selection and/or parametrization depends on multiple reference images.

It is therefore proposed to provide, in at least one embodiment, a group of candidate algorithms that extract certain features from each image. The multiple reference images preferably show a similar object, e.g. a similar area of a different patient. The different reference images can be acquired and/or reconstructed using different imaging parameters and/or different imaging devices. The similar objects can vary in at least one additional feature of the object that influences the image quality or other properties of the reference image. E.g. the Body-Mass-Index or the average cross sectional area of the depicted patients can vary.

The reference images can be used to determine, if the feature extracted by the respective candidate algorithm is suitable for recognising a variation due to a change of the imaging device and/or the imaging parameter and/or the additional parameter and if it is suitable to correct the object feature. In other words it is determined, if the feature extracted by the candidate algorithm is suitable as a surrogate for correcting the feature. The reference images can therefore be used to learn useful candidate algorithms that generate good surrogates for the object feature to be corrected.

It is possible, that some or all of the candidate algorithms depend on a parameter that can be chosen. In the inventive method this parameter can be determined in dependence of the reference images. The selection of the parametrization can e.g. be performed by considering the different parametrizations of a single candidate algorithm as separate candidate algorithms and then selecting one or more of these separate candidate algorithms as determination algorithm or algorithms. With this approach any of the discussed approaches for selecting candidate algorithms can also be used to select a parametrization for candidate algorithms and therefore determination algorithms.

At least one of those candidate algorithms is then used as a determination algorithm to determine the acquisition feature which could also be called surrogate feature. Since the correction of the preliminary feature can use acquisition features that are acquired from regions of the same object, an in-scan phantom is not necessary in the proposed method of at least one embodiment.

If multiple object features are to be determined, e.g. a radiome describing a multitude of parameters of e.g. a tumour, each object feature can be corrected by a different subset of the acquisition features. These subsets can overlap or they can be distinct subsets. It is also possible to use the same subset for multiple object features.

The previous and following discussion mainly focusses on the use of the inventive method in the area of medical imaging, especially in the area of computed tomography. It is however possible to use the method for other acquisition techniques and/or in other fields.

The object image and the reference images can be 2D images or 3D images. The reference images are preferably recorded by different imaging devices and/or while using different imaging parameters and/or the reference images are reconstructed using different imaging parameters during reconstruction.

The candidate algorithms can describe rules for segmenting a respective control region or for choosing one of several already segmented regions as a control region and for determining the acquisition feature from the image data in that control region. Candidate algorithms can also use image data from several control regions.

The correction algorithm can preferably be parametrised by at least one parameter that is determined in dependence of the reference images. The parameter or parameters can be determined by e.g. solving an optimisation problem in the case of a general linear model. It is also possible to use a machine learning approach to train the correction algorithm. E.g. a neural network can be used as the correction algorithm that can e.g. be trained by a back-propagation of error.

If the method is used in the context of radiomics the preliminary features can be considered to be the radiome, which is the set of features extracted from an image. The preferably multiple acquisition features that are determined by applying the determination algorithms to the object image can then be considered to be a technome that collects the relevant technical information concerning the image acquisition and that allows to stabilise and/or correct the radiome. The technome can be considered to be a mathematical model of the qualified acquisition features.

The object feature and the acquisition feature can be numerical values or data structures comprising multiple or numerical values that describe properties extracted from the image. Features can e.g. describe certain textural, shape- and intensity-based features. The object feature is typically extracted from a region of interest and the acquisition features are typically extracted from control regions, where only a small variation of the features between different imaged objects is expected. In medical imaging areas that comprise air, adipose tissue or other mostly homogeneous areas of tissue can be used as control regions.

In radiomics several hundred features are routinely extracted from a region of interest. Since the selection of the used acquisition features is automatic in the proposed method, even larger feature sets can be considered for the acquisition features, e.g. several thousand or even several ten thousand potential acquisition features and therefore candidate algorithms.

A reference feature can be determined for each reference image by using the same algorithm that is used to determine the preliminary feature from the object image, wherein each candidate algorithm is applied to each reference image to determine a candidate feature, wherein a respective correlation measure for the correlation of the respective candidate feature and the reference feature is determined for each candidate algorithm, and wherein the determination algorithm and/or its parametrization is selected in dependence of the correlation measures. The respective correlation measure can e.g. be the covariance of the reference features and the candidate features or be determined from that covariance.

It is also possible to determine to what extent the reference feature depends on the candidate feature and e.g. a label that was previously assigned to the reference image. The label can e.g. describe a biological property of a patient when the method is used in medical imaging.

This determination can e.g. be performed by fitting a general linear model to the data. The correlation measure can than describe the quality of this determination, e.g. the error of the regression used to parametrize the general linear model, and/or a scaling factor that was determined for the dependence of the reference feature on the candidate feature. Especially candidate algorithms that result in a sufficient correlation can be selected. This can be either achieved by a fixed threshold for the correlation measure or by selecting a certain number of candidate algorithms that show the highest correlation. If the reference images are similar to the object image, e.g. is the reference images show the same region of a patient that is also shown in the object image, a sufficient correlation will then be expected between the respective acquisition feature and the preliminary feature.

If there would be a very low correlation between the acquisition feature and the preliminary feature the associated technical variation would hardly influence the preliminary feature and therefore no correction would be necessary. A strong correlation between a feature in the region of interest, e.g. a tumour region, and in a control region, e.g. in an air filled area or in adipose tissue, is typically not caused biologically but by a technical variation. Selecting the determination algorithm or algorithms and/or their parametrization in dependence of the correlation measures therefore ensures that the most relevant acquisition features are used.

At least a subset of the reference images can be modified by applying a modification algorithm for each respective reference image that simulates a change of the imaging device and/or at least one imaging parameter used for acquiring and/or reconstructing that reference image and/or the impact of a change of the additional feature of the object depicted in the reference image and/or that performs a modified reconstruction of the reference image using a modified value for at least one imaging parameter, wherein at least one dependency parameter of a dependence of the change of the reference feature on the change of the respective candidate feature due to the modification of the respective reference image is determined for each reference image of the subset and at least a subset of the candidate algorithms, wherein the dependency parameters are averaged over the subset of the reference images to determine an average dependency parameter for the respective candidate algorithm, and wherein the selection of a respective candidate algorithm as the determination algorithm or as one of the determination algorithms and/or its parametrization depends on the a regression parameter of a regression model for the dependence of the reference feature on the candidate feature in the unmodified reference images and the average dependency parameter determined for that candidate algorithm.

The modification algorithm can generate at least one modified image when applied to the reference image. The modified reference features and the modified candidate features can then be determined from those modified images. The dependency parameter of the dependence can determine a slope for the dependence or a ratio between the change of the reference feature and the change of the candidate feature. The dependency parameter can therefore describe a linear dependency. Alternatively or additionally the dependency parameter can describe different features, e.g. a curvature, of the functional dependency. To determine dependency parameters for a non-linear dependency, multiple modified images can be generated by the modification algorithm for each reference image. The subset of the candidate algorithms used can be chosen depending on the previously calculated correlation measures for the candidate algorithms.

The average dependency parameter calculated from the calculated changes only depends on a change of the technical parameters, namely a change of the imaging device and/or at least one imaging parameter and/or a simulated change of the additional feature of the object. This property can be used to check if the correlation between the candidate feature and the reference feature determined from the reference images is caused purely or mainly by changing the technical parameters and/or the impact of the additional feature. If the calculated regression parameter is similar to the determined averaged dependency parameter, this is a strong indicator that the correlation is purely due to the selection of the imaging device and/or the imaging parameter or parameters and/or the additional feature, since only these changes are simulated by the modification algorithm. It is e.g. possible to only select candidate algorithms and/or parametrizations of those algorithms, wherein the difference between the average dependency parameter and the regression parameter is smaller than a predefined absolute or relative threshold.

The discussed steps can be used to ensure a similarity of the behaviour of the candidate algorithm when applied to simulated changes and when applied to the reference images that are recorded under different conditions. As previously discussed, this ensures that the acquisition feature mainly or exclusively changes due to changes of technical parameters and/or the additional feature or features of the object that influence the image quality or other properties of the image. Additionally the similarity test can be used to ensure that the used modification algorithm represents the influence of technical changes and/or the respective changes in the object to the imaging well.

The modification algorithm can be parametrised by parameters of the imaging device used and/or the imaging parameter or parameters used and/or the additional feature. It is advantageous to start with images with a high resolution and a low noise level and to modify these images to e.g. add blurring and/or noise and/or certain imaging artefacts. These modifications can be used to emulate the influence of the additional feature of the object, e.g. the Body-Mass-Index of a patient, on the image quality or other properties of the image. Those changes in the image quality can also be caused by certain imaging devices and/or combinations of imaging parameters used during the acquisition and/or reconstruction of the image.

Since at least one embodiment of the inventive method can extract all relevant technical information, namely the acquisition features, the modification algorithm can alternatively apply arbitrary modifications that could be caused by technical parameters of the acquisition. E.g. various amounts or types of noise can be added to the image and/or the image can be blurred to varying degrees. The modification algorithm can then be evaluated for its realism.

Multiple different subsets of reference images can be modified by the modification algorithm and a separate average dependency parameter and regression model can be calculated for each of these subsets for the respective candidate algorithm, wherein the selection of a respective candidate algorithm as the determination algorithm or as one of the determination algorithms and/or its parametrization depends on all average dependency parameters and all regression parameters determined for the respective candidate algorithm. The use of different subsets of reference images and multiple average dependency parameters removes or at least reduces the chance of a coincidental similarity between the average dependency parameter or parameters and the regression parameter of the regression model. The different subsets can be distinct or there can be a certain amount of overlap between the subsets.

At least one reference image can be modified by applying the modification algorithm to generate multiple modified images that simulate an image acquisition and/or reconstruction by different imaging devices and/or using different imaging parameters and/or the impact of a modification of the additional feature of the depicted object and/or that are reconstructed using different values for at least one imaging parameter, wherein a modified reference feature and modified candidate feature are determined for the respective candidate algorithm and each modified image, wherein each modified reference feature is determined by applying the algorithm that is used to determine the preliminary feature to the respective modified image and each modified candidate feature is determined by applying the respective candidate algorithm to the respective modified image, wherein a relationship parameter of the relationship between the modified reference features and the modified candidate features is determined for each candidate algorithm, wherein the selection of a respective candidate algorithm as the determination algorithm or as one of the determination algorithms and/or its parametrization depends on the relationship parameter determined for the respective candidate algorithm.

The relationship parameter can e.g. describe the linearity or the quality of a fit to another functional dependency for the relationship. It can be compared to a given threshold or the candidate algorithms providing the highest or lowest values of this relationship parameter can be chosen as determination algorithms or used as a preselection for further selection steps. It is however also possible to compare the relationship parameter to the previously discussed regression parameter for the unmodified reference images to ensure a similar relationship between the candidate features and the reference features in the unmodified images and in the modified images. This can e.g. be used to validate the modification algorithm. This is especially advantageous, when the modification algorithm is based on a simulation of the object and/or the measurement process.

The validation of the modification algorithm and therefore especially of a simulation of the impact of the additional feature of the object and/or the imaging process can also be used to develop and/or enhance simulation algorithms. A simulation can first be developed and then tested with the approach described above and modified. After the modification it can be checked, if its similarity to the behaviour of the system described by the reference images improves or not.

At least one embodiment of the inventive method can therefore start with a rough simulation of the object and/or the imaging process, than firstly improve the simulation by validating it within the inventive method and then use the improved simulation to improve the correction of the preliminary features in at least one embodiment of the inventive method.

An example of a simulation algorithm that simulates a change of the imaged object is the simulation of a contrast bolus, e.g. for contrast enhanced angiography. At least one feature could be extracted from a segment of the object image placed e.g. in the aorta. A change of this feature with respect to other features, e.g. a feature of a tumour texture, could then be compared between the reference images and the modified images to compare the simulation to the in vivo data provided by the reference images. A similar approach could also be used to simulate changes in the body temperature of a patient.

The relationship parameter can be a measure for the linearity of the relationship between the modified reference features and the modified candidate features. Alternatively the relationship parameter can e.g. describe a curvature of this relationship or any other parameter of this relationship.

As already discussed the correction algorithm can use a general linear model for the relationship between the preliminary feature and the acquisition feature. If the previously discussed test shows that the relationship between the modified reference features and the modified candidate features is at least approximately linear, a linearity can also be expected for the relation between the preliminary feature and the acquisition feature, when this candidate algorithm is used as a determination algorithm.

The linearity can e.g. be tested by fitting a linear function to the dependency of the modified reference feature on a respective modified candidate feature in the modified images generated from the same reference image. The error of this fit can then be compared to the threshold and if this error is too large this can be seen as an indication of a nonlinearity. In some embodiments only candidate algorithms that fulfil a linearity condition can be used as determination algorithms.

A respective label can be assigned to at least some of the reference images or a respective region of interest in those reference images, wherein at least a subset of the candidate algorithms is applied to each of these reference images to determine the respective or a respective candidate feature, wherein the same algorithm that is used to determine the preliminary feature from the object image is applied to each of those reference images to determine the or a reference feature, wherein a measure for the statistical interaction of the candidate feature and the label with respect to the reference feature is calculated, and wherein the selection of a respective candidate algorithm as the determination algorithm or as one of the determination algorithms and/or its parametrization depends on the measure for the statistical interaction for the respective candidate algorithm. The labels can be provided manually or by an automatic labelling algorithm. The labels can label features of an object or region of interest depicted in the respective reference image. In biological or medical imaging the labels can e.g. describe a biological variation, e.g. the tumour type of a tumour that is depicted in a specific region of interest or a mortality rate.

Testing for a statistical interaction between a label and the candidate features can be used to eliminate candidate algorithms that result in a strong statistical interaction. If a linear model is used in the correction algorithm, the determined acquisition feature can e.g. be scaled by a parameter of the correction algorithm and then added to the preliminary feature. In other words the preliminary feature and therefore the feature actually determined with the measurement can be considered to be an addition of the object feature and a technical impact of the imaging device and the imaging parameter or parameters and/or the additional parameter of the object. Such an additive approach or other approaches that rely on the orthogonality of the features are only valid, when the summands and features are approximately independent from each other. It is typically not possible to ensure that the additivity assumption and/or orthogonality assumption are completely fulfilled. It is however advantageous to ensure a sufficient additivity and/or orthogonality of the part of the variation of the preliminary feature that is induced by the label, e.g. a biological or medical feature such as a tumour type or a mortality rate, and the part that is due to a variation of the acquisition feature. Preferably the candidate features are therefore selected in such a way that they are orthogonal to the impact of the association between the label and the reference feature.

A statistical interaction of the candidate feature and the label with respect to the reference feature indicates that the impact of the candidate feature on the reference feature depends on the label and vice versa. This is e.g. true when the reference feature depends on the product of a value determined by the label and the candidate feature or for other nonlinear combinations. The label and the candidate feature are therefore no longer purely additive i.e. their impact on the reference feature is not orthogonal. The additivity can be checked by the discussed steps and therefore it can be assured that the respective candidate algorithm works well with a correction algorithm that uses this additivity, e.g. a general linear model or other approaches that expect orthogonal impacts of the medical label and the acquisition feature on the preliminary feature. Therefore it is advantageous to select only candidate algorithms and/or parametrizations, for which the resulting statistical interaction is low, e.g. lower than a given threshold.

The group of candidate algorithms and/or their parametrization can be selected from a group of potential algorithms by acquiring at least two test images of a test object using different imaging devices and/or using different settings for at least one imaging parameter used for acquiring and/or reconstructing the test images, wherein each of the potential algorithms is applied to each test image to determine a respective test feature, wherein a measure for the difference of the test features between the test images is determined for each potential algorithm and wherein the selection of the group of candidate algorithms and/or their parametrization depends on the difference measures. These steps can be used to pre-qualify potential algorithms as candidate algorithms.

Basically the sensitivity of the respective algorithm to changes in the technical parameters is measured. The use of a test object is advantageous, since measurements can be repeated with a variety of parameters and/or devices to provide reference images without increasing e.g. the radiation exposition of the object itself, e.g. a patient. It is possible to only use potential algorithms as candidate algorithms that create large difference measures and are therefore sensitive to changes of the technical parameters. When at least one embodiment of the inventive method is used in medical imaging the test object can be an imaging phantom.

Previously a multitude of tests were discussed that allow for a selection of candidate algorithms and/or their parametrization that are suitable to determine acquisition features that could also be called surrogates, that can be used to correct for the influence of technical features of the image acquisition. If a sufficient amount of candidate algorithms is tested, e.g. thousands or ten thousands of candidate algorithms, a large number of candidate algorithms can meet the discussed criteria. The final selection of the determination algorithms and/or of their parametrization from this pool of qualified candidate algorithms is preferably chosen such that the redundancy and the relevance of the chosen determination algorithms and therefore of the acquisition features that can also be considered to be surrogates is balanced.

It is therefore possible that multiple determination algorithms are selected from the candidate algorithms and/or the available parametrizations or a subgroup of the candidate algorithms and/or parametrizations by a Maximum Relevance Minimum Redundancy algorithm. A different subset of determination algorithms and therefore acquisition features can be used for each of the determined object features.

In radiomics, the entirety of the extracted preliminary features could be labelled as radiome. The entirety of the extracted acquisition features and the correction algorithm that describes the use of these acquisition features to compensate for the influence of a used imaging device or used imaging parameters describes the entirety of the necessary technical information and could be labelled as technome. This technome can directly be used to correct the preliminary features. It is however also possible to integrate this correction into the further processing of the object features. If e.g. the radiome or the preliminary features are processed by an algorithm that was trained using machine learning, the algorithm could have separate inputs for the technome or the acquisition features and the parameters of the correction algorithm that can e.g. describe weighting factors for the different acquisition features.

The correction algorithm can be parametrized by at least one parameter that depends on the reference images. In the most simple case the correction algorithm can add a weighted sum of all or some of the acquisition parameters to a respective preliminary feature to calculate the object feature. In this case the weighting factors for the different acquisition parameters can depend on the reference images. Alternatively the correction algorithm could be a regression algorithm that is trained by machine learning. In this case the parameters could e.g. be input weights for the individual neurons of a neuronal network, split points for decision trees, etc. The parameters can be determined from the reference images by solving an optimisation problem, e.g. in a general linear model, or an algorithm could be trained by machine learning, e.g. by back propagation of error.

To learn the at least one parameter from the reference images it is advantageous when the reference images or at least one respective region of interest of the reference images is labelled, wherein the respective label can be correlated to at least one of the object features. If a sufficient amount of candidate functions are available, the algorithm can be trained in such a way, that the statistical interactions between the acquisition feature or features and the label or labels with respect to the object feature or features are minimized. If the method is used in medical imaging, the regions of interest could e.g. be a tumour and the labels could label a tumour type.

Preferably the or a region of interest can be segmented in the object image, wherein the object feature is determined from the region of interest, wherein at least one control region that is distinct from the region of interest is segmented in the object image, wherein the determination algorithm determines the acquisition feature or features from the control region. As previously discussed, the acquisition feature or acquisition features are preferably independent of the variation in the object. This can e.g. be achieved when investigating objects, e.g. patients in medical imaging, that all contain areas made from a certain material or tissue.

If e.g. the texture of such a material or tissue is approximately independent from the object feature and/or region of interest, features of this texture can be used as acquisition features. It is advantageous, if the respective control region is essentially homogeneous. It is however also possible to find suitable acquisition features, that can be determined from non-homogeneous regions. There are e.g. highly suitable frequency-based acquisition features, that can be determined from a control region located in the liver. While e.g. the liver is not even approximately homogeneous, such acquisition features and determination algorithms used to determine those acquisition features can still be found and selected by the described method. It is however advantageous, to use a high selectivity when segmenting the control region, since it should preferably only contain one type of tissue or material.

In medical imaging it is possible to use air filled regions or adipose tissue as control region in most cases. It can be advantageous to use at least one control region that is located sufficiently far away from a region of interest. Additionally or alternatively at least one control region that is close to the region of interest can be used to, e.g. to easily detect certain artefact types, e.g. streak artefacts. It might e.g. be useful to use control regions that comprise muscle tissue, bone or blood.

The segmentation of the control regions is preferably performed with a high selectivity, such that the control region exclusively contains a certain material or tissue. The determination of acquisition features from the control region can therefore be considered to be a kind of virtual biopsy that determines the features of the image when a certain tissue or material is imaged with a certain imaging device and/or certain imaging parameters.

The candidate algorithms and therefore the determination algorithm or algorithms can especially extract features that concern the texture in one or multiple control regions or a relationship of the textures in multiple control regions. Especially different frequency components of the texture can be extracted and used as the acquisition features.

The region of interest can e.g. be a tumour, a vessel or a certain organ. As object features any feature of this object, e.g. a position relative to other objects or a size of a tumour, a vessel or an organ, etc., can be determined.

It is possible that each candidate or determination algorithm comprises steps for segmenting the relevant control region or control regions. It is however preferable to perform the segmentation of all control regions and of the region of interest only once. Only the selection of the relevant control region or regions from the segmented regions can be performed by the candidate or determination algorithm. E.g. the reference images and/or the object image could be automatically or manually segmented to segment areas that depict air, adipose tissue, the liver, the spleen, the myocard, the trachea, etc. The candidate algorithms could then use this segmentation to operate on the relevant control regions.

The acquisition feature can depend on the concentration of a contrast agent in a control region, especially a blood filled control region like e.g. the aorta in medical imaging. The concentration of a contrast agent in the control region can be indicative of the concentration of the contrast agent in the region of interest, e.g. in a tumour. The concentration of the contrast agent in the region of interest can influence a preliminary feature extracted from this region. This influence can be reduced or corrected by using the discussed acquisition feature.

The image acquisition device can be a medical imaging device and/or the object can be a patient. The reference images can be images that show the same region of interest that is also shown by the object image. They can e.g. show the same organ of the same patient at a different time and/or of other patients.

The object features determined in at least one embodiment of the inventive method and/or the preliminary features and the qualified acquisition features can be used to determine higher level information, e.g. information that indicates the potential existence of a patient's disease, a potential survival time of a patient or the classification of the patient as a member of a certain group. This high level information can be determined by manually investigating the determined object features, especially with the help of a data base that stores such object features for a multitude of patients. Since the discussed method allows a strong reduction of the influence of the imaging device used and/or the imaging parameters used and/or of additional features of the object on the determined object features, data from a larger cohort of patients can potentially be used and analysed.

It is also possible to automatically process all or some of the extracted object features to determine the high level information. To achieve this a rule-based system or a machine learning-based application could be used. As previously discussed a larger data basis from lager patient cohorts could be used to determine the rules of the rule-based system or to teach the machine learning-based application.

In these high level systems it would also be possible to directly feed the preliminary features and the acquisition features to an algorithm. The correction algorithm would then be implemented within this algorithm. The correction algorithm could e.g. form additional layers of a neuronal network, e.g. a convolutional network, used to extract higher level information from the preliminary features and the acquisition features.

The described methods of various embodiments also allow for a prediction of expected preliminary features when changing the scan parameters. If a simulation of the imaging conditions is provided and the simulation is tested as previously described, the simulation can be used to predict the preliminary features and therefore can predict information about the image that would be acquired, when certain scan parameters are used. Since it is possible to test how well the simulation matches the multiple reference images, as discussed previously, such information can have a higher reliability than information gathered from e.g. first principle simulations.

The use of a new kernel during image reconstruction or new image acquisition protocols can have a strong influence on the resulting preliminary features extracted from the resulting images. If these preliminary features would be directly used as input data for a machine learning algorithm, this algorithm would therefore need to be retrained. Since the influence of these new kernels or acquisition protocols on the extracted features can be largely eliminated by at least one embodiment of the inventive method, the resulting corrected object features can be directly used with such an algorithm without retraining the algorithm.

In the same way an influence of certain additional features of the object that might influence the image quality or other properties of the image, e.g. the Body-Mass-Index, a height or a bone structure of a patient or a contrast agent concentration, can be reduced prior to the application of the machine learning algorithm to avoid a need for retraining, when those parameters change, or the use of a larger cohort for training the algorithm to also handle these additional parameters in the trained algorithm.

Data generated in at least one embodiment of the inventive method can also be used in the design of post-processing algorithms for the object image. Filter parameters can be varied and an optimisation problem can be solved that e.g. maximises the correlation between a given, especially medical, information, especially a label, and the determined preliminary feature or features and minimises the correlation between the determined preliminary feature or features and the determined acquisition feature or features. Information that is mostly independent of the object and mainly dependent on the technical features of the image acquisition is therefore filtered out, while information that represents features of the object is mostly kept in tact.

Besides embodiments of the inventive method, at least one embodiment of the invention also concerns a processing unit, especially a processing unit of a medical imaging device, configured to perform a method according to at least one embodiment of the present invention.

At least one embodiment of the invention also concerns a computer program that can be directly loaded into a memory unit of a processing unit, especially a processing unit of a medical imaging device, the computer program comprising instructions for performing the steps of the method according to at least one embodiment of the present invention when the program is executed on the processing unit.

At least one embodiment of the invention also concerns a non-transitory computer-readable storage medium containing electronically readable instructions comprising the computer program according to at least one embodiment of the present invention.

FIG. 1 shows a flow chart of a method for determining at least one object feature of an object that is at least partially depicted by an object image. The method will be explained in the context of medical imaging with reference to computed tomography data. The same method could however be also used for different image acquisition techniques and/or outside of the context of the medical imaging. The processed image data can be two dimensional or three dimensional.

The method shown in FIG. 1 can be divided into two parts. The steps S1, S2 and S3 are preliminary steps that select the determination algorithms and parametrise a correction algorithm that is used during the determination of an object feature. In the steps S4 to S9 these selected determination algorithms and the parametrised correction algorithm are then used to determine the object feature, wherein an influence of technical parameters of the image acquisition is limited by the use of the correction algorithm.

While the steps S1, S2 and S3 are typically performed before step S4, our detailed explanation of the method will start with step S4, since the relevance of the steps S1, S2 and S3 will be easier to understand when they are explained in the context, in which the selected determination algorithms and correction algorithm parameters are actually used.

In step S4 an object image is acquired. An example for an object image 1 is shown FIG. 2. A single slice of a CT-data set of an imaged object 2, in this case a phantom, is shown. In real life applications the imaged object 2 would typically be a patient when the method is used in medical imaging. A phantom is used in this example, since phantoms have an easier structure and the distinct features of the object 2 are therefore more easily recognisable in the schematic drawing than in the case of a real patient.

In step S5 the image 1 is segmented into two regions of interest 3, 4, that are for example tumours, and two control regions 5, 6. The segmentation can be performed manually. It is however preferable to use an automatic segmentation algorithm. A multitude of such algorithms is known in the prior art. The automatic segmentation will therefore not be discussed in detail.

The control regions 5, 6 are regions that are expected to be essentially homogeneous and to be not or hardly influenced by the object features that will be determined for the regions of interest 3, 4. The control region 6 can comprise adipose tissue and the control region 5 can be air filled. Such control regions 5, 6 can typically be easily segmented in computed tomography images. If an automatic segmentation algorithm is used, the control regions 5, 6 are preferably segmented with a very high specifity, such that essentially only one tissue type or one material is present in the control regions 5, 6.

In step S6 a multitude of preliminary features of the object 2 and especially of the regions of interest 3, 4 are extracted from the image 1. The preliminary features can e.g. describe the relative position of the tumours with respect to other detected features, sizes of the tumours, textures of the tumours, etc. The extracted information can e.g. be intended to classify the tumours in the regions of interest 3, 4. The extraction of multiple features from images, especially from CT-images, is well known in the prior art, especially in the area of radiomics.

Especially when features that are extracted from object images from a multitude of sources are to be combined, e.g. to train a machine learning algorithm used to determine higher level information like cancer types, the influence of the imaging device used to acquire the image 1 and the image parameters used during the image acquisition and/or the image reconstruction and/or of additional parameters of the object on the determined preliminary features can be problematic. To reduce or preferably eliminate this influence, acquisition features of the image 1 are determined in step S7, that are preferably independent of the object feature to be determined and depend on the imaging device and/or imaging parameters used. This is achieved by using several determination algorithms, that each select one or more control regions 5, 6 that are relevant for the respective acquisition feature and extract the respective acquisition feature from these regions. The determination algorithms or at least some of the determination algorithms can determine acquisition features that depend on textural information in the control regions 5, 6. E.g. a frequency distribution in the texture, a direction or a steepness of gradients, a symmetry group of the texture or similar information can be considered.

The selection of the determination algorithms to use is none trivial for several reasons. It is often not obvious, which of the discussed features actually change when changing the imaging device and/or at least one imaging parameter concerning the image acquisition or the reconstruction of the object image 1 and/or when the object and therefore the additional parameters are changed. Additionally some of the discussed features might also be correlated to changes of the features of the object, especially in the regions of interest 3, 4, in some non-obvious way. E.g. the texture of a tumour, that might be the desired object feature, might correlate to the texture in adipose tissue due to an inflammation or edema in the case of cancer. If a large number of potential algorithms are investigated there might also be a random correlation between the output of an algorithm and the mentioned parameters for a certain dataset that might not exist for a different dataset. It is therefore necessary to select qualified algorithms from the available algorithms. A manual selection of the determination algorithms is therefore hardly possible or would have to be done by trial and error. On the other hand there are thousands of potential acquisition features that correspond to textures in the control regions 5, 6 and that might be exploited to improve the feature extraction in the regions of interest 3, 4. To solve this problem the method shown in FIG. 1 uses an automatic selection of the used determination algorithms from a group of candidate algorithms. This will now be discussed with reference to the steps S1 and S2.

In step S1 a multitude of reference images is provided. The reference images show similar objects and use similar imaging conditions. E.g. the reference images can be a multitude of computed tomography data sets acquired with a variety of imaging devices and imaging parameters for multiple patients that depict a similar region of the body of the respective patient that is also depicted in the object image 1 acquired in step S4.

The reference images are used in step S2 to select the determination algorithms from a large group of candidate algorithms, e.g. thousands or ten thousands of candidate algorithms. The selection of the determination algorithms will be discussed in more detail later. Roughly speaking the candidate algorithms are applied to the reference images and it is tested if a feature extracted from the respective image by the candidate algorithm is correlated with a respective change in the preliminary feature extracted from the region of interest due to the imaging device or the imaging parameter used. It is also tested, if the behaviour of the candidate algorithm conforms with a model used for the correction of the preliminary feature extracted in step S6. These tests will later be described in detail with reference to FIG. 3.

The selected determination algorithms are then used in step S7 to extract a multitude of acquisition features that can also be considered surrogates for the technical variation and/or the variation of additional object features that might influence the image quality or other properties of the image.

In step S8 a correction algorithm determines the respective object feature from the associated preliminary feature and at least some of the acquisition features determined in step S7. The correction algorithm can be a general linear model, a machine learning algorithm or some other algorithms that is parametrised by a parameter set that is determined in step S3 from the reference images provided in step S1.

If a general linear model is used, each object feature is calculated by adding a weighted sum of at least some of the acquisition features to the preliminary feature. The weighting factors for the individual acquisition features can be positive or negative. Normally to parametrise such a general linear model a mutual covariance analyses is performed between the surrogate that is used to correct the feature and the feature extracted from the region of interest. In the described method the acquisition features would be used as a surrogate. The correlation or covariance or a measure for these features is typically already determined in step S2 for each of the candidate algorithms and therefore also for the determination algorithms. Step S3 can therefore simply select the relevant measures already determined in step S2 and optionally scale them to use them as prefactors in step S8.

In an alternate embodiment it would be possible to use machine learning to train the correction algorithm. The parameters could in this case e.g. be the input weights of the neurons of a neuronal network, splitpoints for decision trees or similar parameters. A machine learning algorithm could be used when the reference images or their regions of interest are labelled with labels that have a strong correlation to the object features to be determined. During the learning process the correction algorithm could be applied to all of the reference images. A back propagation of error could then be used to e.g. maximise the correlation of the determined object features for each reference image to the respective label or labels.

Once the parameters are determined, the correction algorithm can be directly applied to calculate the object information from the preliminary information determined in step S6 and the relevant acquisition features determined in step S7.

In step S9 a set of object features is provided that is largely independent of the imaging device and the imaging parameters used to acquire and/or reconstruct the object image. This object information can be manually inspected, stored in a data base to e.g. perform a statistical analysis or to train a machine learning algorithm, or be used as a feature vector for a rule based or machine learning based algorithm that determines higher order information, e.g. a tumour type for the tumours in the region of interest 3, 4.

Figure 3:
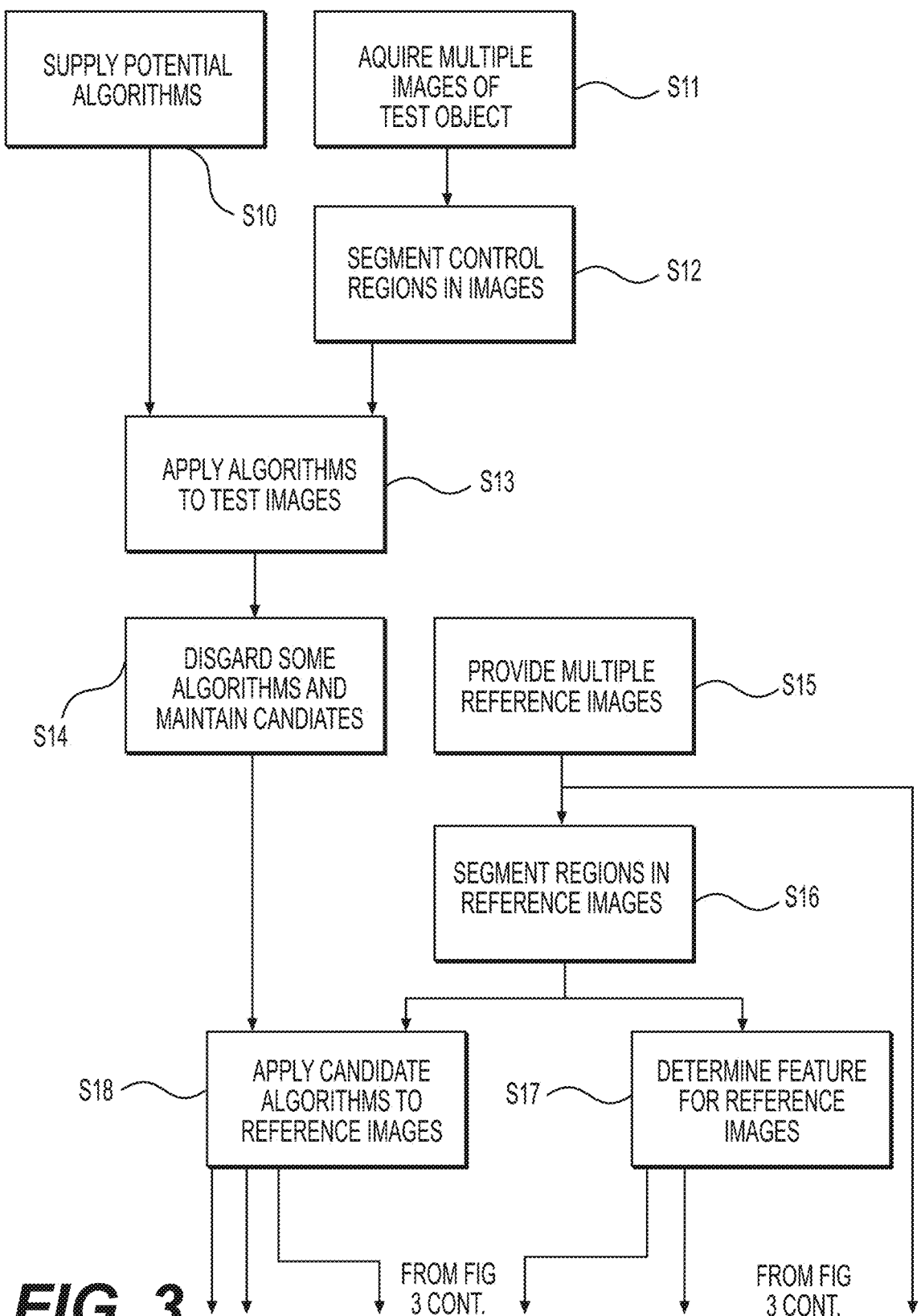
Figure 3:
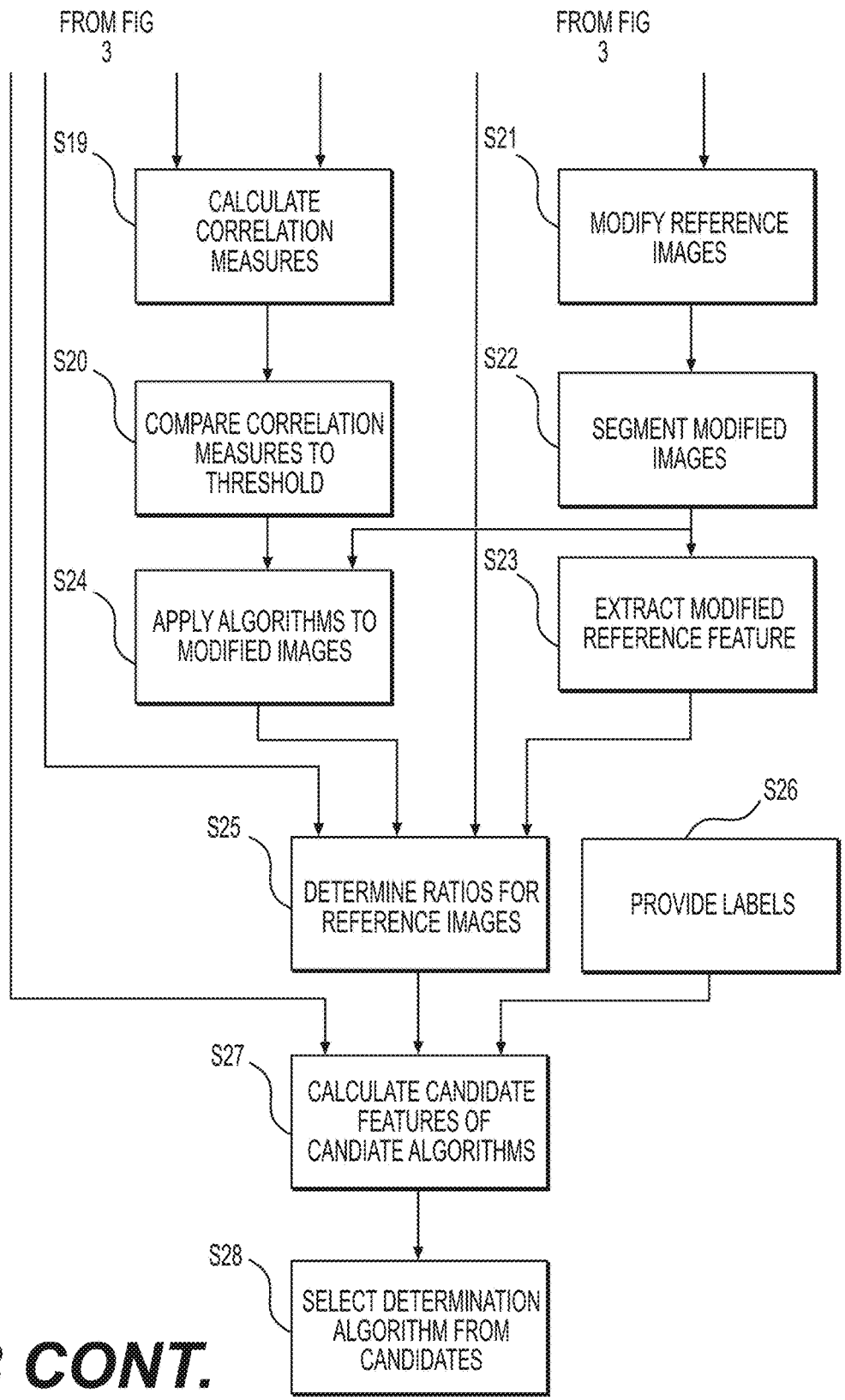

FIG. 3 shown in detail how the determination algorithms are selected in step S2 in FIG. 1. Initially a large number of potential algorithms is supplied in step S10. Any algorithm that can operate on one control region 5, 6 or multiple control regions 5, 6 and that can output multiple values can be used. Preferably algorithms with quasi continuous outputs that can output a multitude of values with a fixed or variable step size are used. Preferably at least some of the potential algorithms are sensitive to texture information in the control regions 5, 6. The algorithms can e.g. analyse the frequency content of a texture in the control regions 5, 6, compare textures in different subregions of the control regions 5, 6, use convolution kernels and extract resulting maxima or minima or average values after applying these convolution kernels, etc. A large number of these types of algorithms can easily be taken from the prior art or be manually constructed.

To select the determination algorithms from these potential algorithms, multiple rounds of testing and algorithm selection are performed. Firstly the potential algorithms that can be considered as potential surrogates for the correction are prequalified using test acquisitions of test images of a test object. In step S11 multiple images of a test object are acquired, wherein different imaging devices and/or different settings for at least one image parameter are used for acquiring and/or reconstructing the respective test image. A variation of features due to changes in the object should be avoided. If the method is used in the context of medical imaging it is therefore advantageous to use a phantom as the test object. If e.g. a computer tomograph is used for image acquisition, a slice thickness, an irradiation intensity or an irradiation time can be varied.

In step S12 control regions are segmented in all test images. Preferably the control regions are regions that mostly or exclusively consist of a single material or type of tissue. Therefore the segmentation can be performed with a high selectivity. Control regions should mainly be regions for which little or no changes are expected with a change in the object feature. E.g. air filled areas, adipose tissue and/or other tissue types and blood filled regions of vessels can be segmented as control regions. Since mostly regions that comprise only a single material or type of tissue are segmented, a feature extraction from the control regions can be considered to be a virtual biopsy of the segmented tissue or material. The segmentation of certain tissue types in medical imaging or regions that consist of a specific material in other types of imaging are well known in the prior art and will not be discussed in detail. A high specificity should be used for the segmentation, since the presence of multiple tissue types, e.g. of muscle and adipose tissue, or materials in the same control region will often result in a strong influence of features of the object on the extracted test feature. It is possible to provide rules for segmenting the control regions as part of the potential algorithms in step S10. Preferably there are however fixed rules for segmenting the control regions and the respective potential algorithms comprise information, which type of control region is used as input data for the respective algorithm.

In step S13 the potential algorithms provided in step S10 are applied to the image data in the control regions. Each potential algorithm is applied to all of the test images to generate a test feature for each pair of a potential algorithm and a test image. A measure for the difference of the test features that are determined by the same potential algorithm for different test images is calculated. This can e.g. be the variance of the test features for this potential algorithm.

In step S14 potential algorithms that have a difference measure smaller than the given threshold are discarded. The other algorithms are then used as candidate algorithms that are further tested using the reference images. The steps S11 to S14 ensure that all candidate algorithms are actually sensitive to the technical variations that should be compensated.

In step S15 a multitude of reference images are provided. This step is equivalent to the step S1 in FIG. 1. In each reference image at least one region of interest 3, 4 and at least one control region 5, 6 is segmented in step S16. The control regions can be segmented using the same or similar rules as in step S12. Approaches for segmenting certain regions of interest, e.g. certain organs or tumours, are well known in the prior art and will not be discussed in detail.

In step S17 a reference feature is determined for each reference image by using the same algorithm that is used in step S6 to determine the preliminary feature. If multiple preliminary features are determined in S6, multiple reference features are also determined in step S17. The following discussion will only consider one algorithm used to determine one preliminary feature. The relevant steps can easily be expanded to take into account multiple algorithms and therefore e.g. multiple reference features.

In step S18 each candidate algorithm is applied to each reference image to determine a respective candidate feature from at least one of the control regions.

In step S19 a correlation measure is calculated for each pair comprising a respective candidate algorithm and an algorithm used in step S6 to determine the preliminary feature. For each of these pairs a pair of algorithm results for each reference image exists. The correlation measure can then be calculated by calculating the covariance of these algorithm results. The correlation measure can preferably be normalised, e.g. by the product of the standard deviations of the algorithm results, to determine the correlation coefficient.

The correlation measures are compared to a threshold in step S20 and those candidate algorithms that have correlation measures lower than this threshold are discarded and not considered in the further steps. Since the correlation measures will typically be different for different algorithms used to determine the preliminary features in step S6, different subgroups of the candidate algorithms will be considered in the following steps for different algorithms used to determine the preliminary feature in the step S6. In other words different surrogates will be chosen for different object features. To simplify the further discussion, the discussion will be limited to one of these subgroups for one object feature.

The steps S15 to S20 ensure that only candidate algorithms can be used as determination algorithms, whose output results for the reference images sufficiently correlate to the reference features for these reference images. It is therefore expected that the outputs of these candidate algorithms when applied to the object image will also strongly correlate to the preliminary feature. If there would be no sufficient correlation, the use of the result of the application of that candidate algorithm to correct the preliminary feature would not be advantageous, since there would be no or hardly any correlation between the feature to be corrected and the feature used to correct this feature. In other words the steps S15 to S20 serve to ensure an association of the feature determined by the candidate algorithm with the feature determined by the algorithm used to determine the preliminary feature in step S6.

The following steps will further reduce the number of candidate algorithms by ensuring that the correlation that was determined in the steps S15 to S20 is actually driven by the varying imaging device and/or imaging parameters used in the reference images and/or a variation in the additional feature of the respective depicted object and that the discovered correlation actually corresponds to an approximately linear relationship between the results of the algorithms. Checking the linearity it advantageous, since the covariance analysis performed previously assumes such a relationship and could therefore provide wrong results if there is no such linear relationship and since the use correction algorithm will typically be linear, e.g. a general linear model. Alternatively the steps could be modified to take non-linear relationships into account.

To perform this analysis the reference images are modified in step S21 by applying a modification algorithm to each reference image that simulates a change of the imaging device and/or at least one imaging parameter used for acquiring and/or reconstructing that reference image and/or of the additional feature of the object. Preferably multiple modified images are generated for each reference image or for at least one of the reference images that can later be used to check for the linearity.

The changed imaging conditions can e.g. be simulated by adding noise to the reference images and/or by adding additional blurring, e.g. by applying a convolution kernel to the respective image. These modifications can be motivated by an actual simulation of the imaging process. It is however also possible to just modify the reference images without a detailed knowledge of the imaging process.

The modified images are then segmented in step S22 as already discussed with respect to step S16.

In step S23 a modified reference feature is extracted from the region of interest by applying the same algorithm to the respective modified image that is used in step S6 to extract the preliminary feature.

In step S24 the subgroup of the candidate algorithms selected in step S20 is applied to each respective modified image.

In step S25 a ratio between the change of the reference feature due to the modification and the change of the respective candidate feature due to the modification is determined for each reference image and each candidate algorithm of the subset. If only one modified image is calculated for a reference image in step S21 this ratio can be the quotient of the difference between the modified reference feature and the reference feature and the difference of the modified candidate feature and the candidate feature or vice versa. If multiple modified images are generated for a reference image this ratio can be determined by fitting a linear regression model to the relationship between the modified reference feature and the modified candidate feature for the modified images of that reference image. The reference feature and candidate feature determined for the original reference image prior to the modification can be used as an additional data point in this regression.

The error of this regression can be used as a measure for the linearity of the relationship between the candidate feature and the reference feature for the respective candidate algorithm. Such a measure can e.g. be calculated by averaging the error for all reference images.

The determined ratios are averaged over all reference images to determine an average ratio for the respective candidate algorithm. This ratio is then compared to a regression parameter, namely the slope, of a linear regression model for the dependence of the reference feature on the candidate feature in the unmodified reference images. If this comparison indicates a different dependency between candidate feature and reference feature in the simulation and in the reference data set the respective candidate algorithm is discarded and not used in the further considerations. By discarding those candidate algorithms, a new subgroup of relevant candidate algorithms is found that are further checked the further steps.

The comparison between the ratio of the changes determined in the simulation and the slope of the regression curve serves to test the similarity of the behaviour of the candidate algorithm under simulation conditions and for natural variations in a real data set, namely the reference images. It is therefore tested if the association or functional relationship of the reference features and the candidate features or surrogates is similar in vivo and in silico. If a similar behaviour is found, it indicates the validity of the simulation for the respective candidate algorithm and the algorithm used to determine the reference feature. This is advantageous since this simulation is used to determine a measure for the linearity as discussed above. A selection that depends on the measure of linearity and therefore the use of acquisition features that can be used for a linear additive correction of the preliminary feature allows for a simple generation and parametrization of the correction algorithm. Additionally, since the simulation only simulates changes of the image acquisition and processing and does not simulate any changes of the object or object features, this similarity indicates that the determined correlation between the candidate feature and the reference feature is actually due to technical imaging parameters and not due to a correlation between the objects depicted in the various reference images.

Preferably candidate algorithms for which the previously determined measure for the linearity does not fulfil a given condition can also be discarded. The selection of the currently considered candidate algorithms depends on a correlation measure, which might be incorrect, if there is no linear dependence of the reference feature on the candidate feature. This limitation is also advantageous, since typically linear correction algorithms are used.

For the resulting subgroup of candidate algorithms the independence of the resulting candidate features from the relevant object features can be checked in the following steps. To perform this check, additional information is provided in step S26 in the form of respective labels that are assigned to at least some of the reference images or the respective regions of interest in these reference images. E.g. different tumour types can be labelled when the method is used in the context of medical imaging.

In step S27 the candidate features for the candidate algorithms that are still relevant can either be calculated or taken from the previously calculated candidate values in step S18. A measure of the statistical interaction of the respective candidate feature and the different labels with respect to a respective reference feature can then be calculated, e.g. by fitting a regression model that contains at least one term that couples those features in a non-linear manner. If a strong statistical interaction between a candidate feature and a label or a set of labels is determined, the candidate algorithm used to determine this candidate feature can be discarded. A high statistical interaction means that the result of that candidate algorithm strongly interacts with features of the depicted object that are described by the labels. Since the determination algorithms should generate acquisition features that are largely independent of the object depicted, candidate algorithms that show those dependencies can be discarded, especially when the respective label shall be predicted by the then corrected object feature later on.

After the previously discussed tests and reductions of the set of candidate algorithms, a subset of the candidate algorithms remains, wherein each of the remaining candidate algorithms was successfully tested for a multitude of properties that are advantageous when it is used as a determination algorithm. If a sufficient amount of candidate algorithms or potential algorithms was tested, there might still be a large number of candidate algorithms in the resulting subset in step S28. Since unnecessary redundancy should be avoided, a Maximum Relevance Minimum Redundancy algorithm can be used in step S28 to select the determination algorithms from the remaining candidate algorithms.

In an alternative embodiment to the one discussed above, the tests in step S25 can be expanded to ensure that the discovered similarity between the behaviour of the candidate algorithm with respect to simulation and the reference data set is not accidental. To achieve this multiple different subsets of the reference images can be modified by the modification algorithm and a separate average ratio and linear regression model can be calculated for each of these subsets for each respective candidate algorithm. The remaining candidate algorithms can then be chosen in dependence of all average dependency parameters and all regression parameters determined for the respective candidate algorithms.

Figure 2:
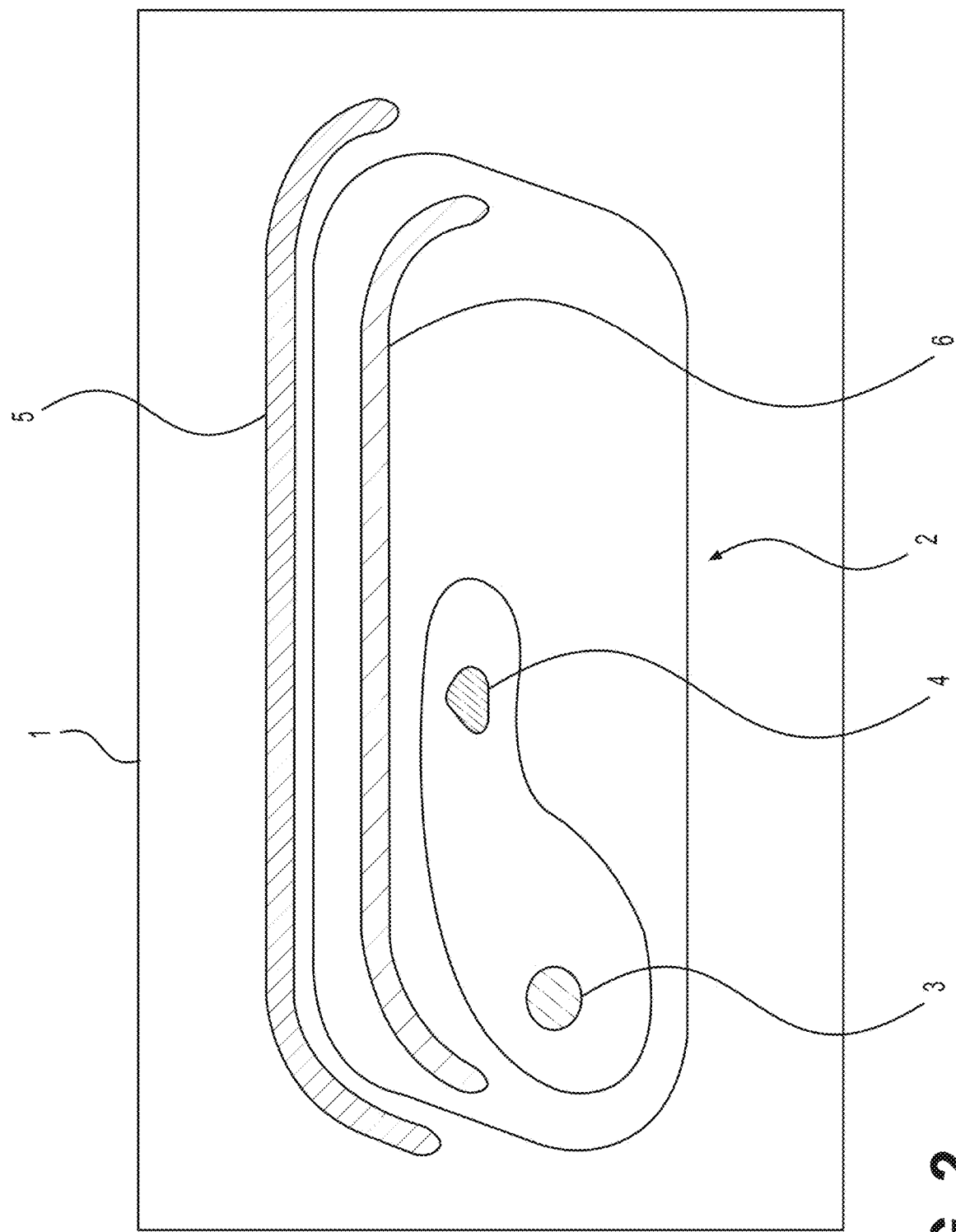
Figure 4:
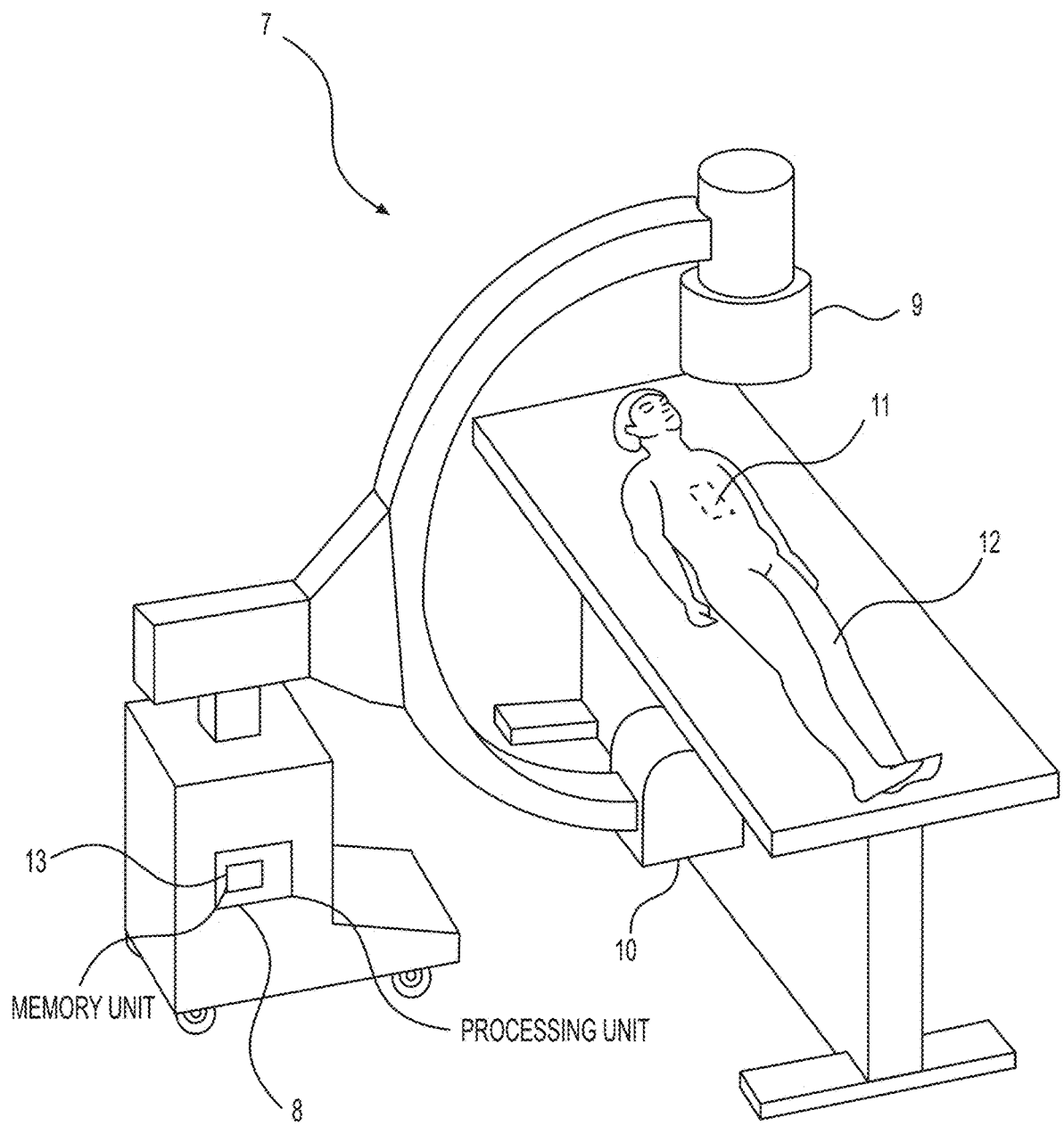

FIG. 4 shows a medical imaging device 7, in this case a C-arm X-ray device that comprises a processing unit 8 that is configured to perform the method that was previously described with reference to the FIGS. 1 to 3. An object image that depicts the region 11 of an object 12, in this case a patient, can be acquired via the X-ray source 9 and the X-ray detector 10. The object image can then be processed as previously discussed. This allows to reduce the dependency of the recorded object features on the hardware and the parameters used to acquire the image. This is especially advantageous when a multitude of object features should be provided for a data base that collects these object features for a multitude of patients and image acquisitions. Such data bases can e.g. be useful for training machine learning algorithms or to e.g. classify the object 12, e.g. to recover possible treatments, tumour types, etc. In the discussed method and processing unit even very complex features that can e.g. be determined by a machine learning algorithms can be used as object and/or acquisition features. Even highly complex features like the Fractional Fluid Reserve can be used.

The method can be implemented by a computer program that can be directly loaded into the memory unit 13 of the processing unit 8.

The computer program can be provided in the form of a non-transitory computer-readable storage medium (not shown), containing electronically readable instructions comprising the computer program.

Although the present invention has been described in detail with reference to the preferred embodiment, the present invention is not limited by the disclosed examples from which the skilled person is able to derive other variations without departing from the scope of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for determining at least one object feature of an object, at least partially depicted by an object image, the method comprising:

determining a respective preliminary feature for each respective object feature, of the at least one object feature, and determining at least one acquisition feature from the object image, the respective preliminary feature depending on the respective object feature and on an imaging device used to acquire at least one of the object image and at least one imaging parameter usable for at least one of acquiring and reconstructing at least one of the object image and an additional feature of the object, the at least one acquisition feature being dependent upon at least one of the imaging device, the at least one imaging parameter and the additional feature of the object; and determining, via a correction algorithm, the respective object feature from the respective preliminary feature and the at least one acquisition feature, wherein the determining of the at least one acquisition feature includes determining the at least one acquisition feature by a respective determination algorithm, at least one of selected and parametrized from a group of candidate algorithms, and wherein the at least one of selection and parametrization depends upon multiple reference images.

2. The method of claim 1, further comprising:

determining a respective reference feature for each reference image, of the multiple reference images, using a same algorithm as that used to determine the respective preliminary feature from the object image, wherein each respective candidate algorithm, of the group of candidate algorithms, is applied to each respective reference image to determine a respective candidate feature, and determining a respective correlation measure, for correlation of the respective candidate feature and the respective reference feature, for each respective candidate algorithm, and selecting and parameterizing the respective determination algorithm, in dependence of the respective correlation measure determined.

3. The method of claim 2, further comprising:

modifying a subset of the reference images by applying a modification algorithm for each respective reference image, of the multiple reference images, the modification algorithm at least one of simulating at least one of a change of at least one of the imaging device and at least one imaging parameter used for at least one of acquiring and reconstructing the respective reference image, and an impact of a change of the additional feature of the object depicted in the reference image, and performing a modified reconstruction of the reference image using a modified value for at least one imaging parameter, and determining, for each respective reference image of the subset and a subset of the candidate algorithms, at least one dependency parameter of a dependence of a change of the respective reference feature on a change of the respective candidate feature due to the respective reference image modification, wherein a plurality of the respective at least one dependency parameters are averaged over the subset of the reference images to determine an average dependency parameter for the respective candidate algorithm, and wherein the at least one of selecting and parameterizing of a respective candidate algorithm as the determination algorithm or the selection of a respective candidate algorithm as one of the determination algorithms depends upon a regression parameter of a regression model for the dependence of the reference feature on the candidate feature in unmodified reference images and the average dependency parameter determined for the respective candidate algorithm.

4. The method of claim 3, wherein multiple different subsets of reference images are modified by the modification algorithm and wherein a separate average dependency parameter and regression model are calculated for each of the respective different subset of the subset of reference images for the respective candidate algorithm, and wherein the selecting and parameterizing of a respective candidate algorithm as the determination algorithm or as one of the determination algorithms depends upon all average dependency parameters and all regression parameters determined for the respective candidate algorithm.

5. The method of claim 4, wherein at least one reference image is modified by at least one of
  applying the modification algorithm to generate multiple modified images simulating at least one of image acquisition and reconstruction by different imaging devices,
  using at least one of different imaging parameters and an impact of a modification of the additional feature of the depicted object and different respective imaging parameters reconstructed using respective different values for at least one imaging parameter, and
  determining a respective modified reference feature and a respective modified candidate feature for the respective candidate algorithm and each respective modified image,
  determining each respective modified reference feature by applying the respective algorithm used to determine the respective preliminary feature to the respective modified image, and
  determining each respective modified candidate feature by applying the respective candidate algorithm to the respective modified image,
  determining a relationship parameter of the relationship between the modified reference features and the modified candidate features for each respective candidate algorithm, wherein the selecting and parameterizing of a respective candidate algorithm as the determination algorithm or as one of the determination algorithms depends on the relationship parameter determined for the respective candidate algorithm.

6. The method of claim 5, wherein the relationship parameter is a measure for linearity of a relationship between the modified reference features and the modified candidate features.

7. The method of claim 2, wherein a respective label is assigned to at least some of the reference images or a respective region of interest in the at least some of the reference images, wherein at least a subset of the candidate algorithms is applied to each of the at least some of the reference images to determine the respective candidate feature, wherein an algorithm, similar to the algorithm used to determine the preliminary feature from the object image, is applied to each of the at least some of the reference images to determine the respective reference feature, wherein a measure for statistical interaction of the candidate feature and a label with respect to the respective reference feature is calculated, and wherein selecting and parameterizing of a respective candidate algorithm as the determination algorithm or as one of the determination algorithms is dependent upon the measure for the statistical interaction for the respective candidate algorithm.

8. The method of claim 2, wherein at least one of the group of candidate algorithms and a parametrization of the group of candidate algorithms is selected from a group of potential algorithms by acquiring at least two test images of a test object using at least one of different imaging devices and different settings for at least one imaging parameter used for at least one of acquiring and reconstructing the test image, wherein each of the potential algorithms is applied to each test image to determine a respective test feature, wherein a respective measure for a difference of the test features between the test images is determined for each potential algorithm, and wherein the at least one of selecting and parameterizing of at least one of the group of candidate algorithms depends upon the respective measures.

9. The method of claim 1, wherein the correction algorithm is parametrized by at least one parameter dependent upon the reference images.

10. The method of claim 1, further comprising:
  segmenting a region of interest in the object image;
  wherein the determining of the respective object feature includes determining the respective object feature from a segmented portion of the region of interest,
  wherein at least one control region, distinct from the region of interest, is segmented in the object image, and
  wherein the respective determination algorithm determines the at least one acquisition feature from at least one the control region.

11. The method of claim 10, wherein the acquisition feature depends on a concentration of a contrast agent in a control region.

12. The method of claim 1, wherein at least one of the object image is an object image acquired by a medical imaging device and the object is a patient.

13. A processing unit, configured to at least
  determine a respective preliminary feature for each respective object feature, of at least one object feature, and
  determine at least one acquisition feature from an object image, the respective preliminary feature depending on the respective object feature and on an imaging device used to acquire at least one of the object image and at least one imaging parameter usable for at least one of acquiring and reconstructing at least one of the object image and an additional feature of the object, the at least one acquisition feature being dependent upon at least one of the imaging device, the at least one imaging parameter and the additional feature of the object; and
  determine, via a correction algorithm, the respective object feature from the respective preliminary feature and the at least one acquisition feature, including the processing unit being further configured to determine the at least one acquisition feature by a respective determination algorithm, at least one of selected and parametrized from a group of candidate algorithms, and wherein the at least one of selection and parametrization depends upon multiple reference images.

14. A memory unit storing a computer program including instructions for performing the method of claim 1 when the computer program is executed on a processing unit of a medical imaging device.

15. A non-transitory computer-readable storage medium storing electronically readable instructions of a computer program, for performing the method of claim 1 when the computer program is executed on a processing unit.

16. The method of claim 1, wherein the object image is an object image acquired by a medical imaging device.

17. A medical imaging device comprising the processing unit of claim 13.

18. A medical imaging device comprising the memory unit of claim 14.

19. The method of claim 3, wherein at least one reference image is modified by at least one of
- applying the modification algorithm to generate multiple modified images simulating at least one of image acquisition and reconstruction by different imaging devices,
- using at least one of different imaging parameters and an impact of a modification of the additional feature of the depicted object and different respective imaging parameters reconstructed using respective different values for at least one imaging parameter, and
- determining a respective modified reference feature and a respective modified candidate feature for the respective candidate algorithm and each respective modified image,
- determining each respective modified reference feature by applying the respective algorithm used to determine the respective preliminary feature to the respective modified image, and
- determining each respective modified candidate feature by applying the respective candidate algorithm to the respective modified image,
- determining a relationship parameter of the relationship between the modified reference features and the modified candidate features for each respective candidate algorithm, wherein the selecting and parameterizing of a respective candidate algorithm as the determination algorithm or as one of the determination algorithms depends on the relationship parameter determined for the respective candidate algorithm.

20. The method of claim 19, wherein the relationship parameter is a measure for a linearity of a relationship between the modified reference features and the modified candidate features.

21. The method of claim 1, wherein a respective label is assigned to at least some of the reference images or a respective region of interest in the at least some of the reference images, wherein at least a subset of the candidate algorithms is applied to each of the at least some of the reference images to determine the respective candidate feature, wherein an algorithm, similar to the algorithm used to determine the preliminary feature from the object image, is applied to each of the at least some of the reference images to determine the respective reference feature, wherein a measure for the statistical interaction of the candidate feature and a label with respect to the respective reference feature is calculated, and wherein selecting and parameterizing of a respective candidate algorithm as the determination algorithm or as one of the determination algorithms is dependent upon the measure for the statistical interaction for the respective candidate algorithm.

22. The method of claim 1, wherein at least one of the group of candidate algorithms and a parametrization of the group of candidate algorithms is selected from a group of potential algorithms by acquiring at least two test images of a test object using at least one of different imaging devices and different settings for at least one imaging parameter used for at least one of acquiring and reconstructing the test image, wherein each of the potential algorithms is applied to each test image to determine a respective test feature, wherein a respective measure for a difference of the test features between the test images is determined for each potential algorithm, and wherein the at least one of selecting and parameterizing of at least one of the group of candidate algorithms depends upon the respective measures.

23. The method of claim 2, wherein the correction algorithm is parametrized by at least one parameter dependent upon the reference images.

* * * * *